United States Patent [19]

Masuda

[11] Patent Number: 4,874,036
[45] Date of Patent: Oct. 17, 1989

[54] HEATING AND AIR CONDITIONING SYSTEM FOR A FORKLIFT

[75] Inventor: Kenji Masuda, Nitta, Japan

[73] Assignee: Sanden Corporation, Gunma, Japan

[21] Appl. No.: 218,987

[22] Filed: Jul. 14, 1988

[30] Foreign Application Priority Data

Jul. 14, 1987 [JP] Japan ............... 62-106925[U]
Jul. 14, 1987 [JP] Japan ............... 62-106926[U]

[51] Int. Cl.$^4$ ............................................. B60H 1/00
[52] U.S. Cl. .................................... 165/42; 165/124;
62/244; 237/12.3 A; 237/12.3 B; 98/2.03;
98/2.11
[58] Field of Search ................. 165/41, 42, 43, 126,
165/124; 62/239, 244; 237/12.3 A, 12.3 B;
98/2.11, 2.03

[56] References Cited

U.S. PATENT DOCUMENTS

| | | | |
|---|---|---|---|
| 2,774,227 | 12/1956 | Schjolin et al. | 98/2.11 |
| 4,344,356 | 8/1982 | Casterton et al. | 165/42 |
| 4,365,541 | 12/1982 | Marques et al. | 98/2.11 |
| 4,401,013 | 8/1983 | Ohashi et al. | 165/42 |
| 4,612,975 | 9/1986 | Ikari | 165/43 |

FOREIGN PATENT DOCUMENTS

| | | | |
|---|---|---|---|
| 0125562 | 11/1984 | European Pat. Off. | 165/42 |
| 0198112 | 12/1982 | Japan | 165/42 |
| 0202916 | 9/1986 | Japan | 237/12.3 A |
| 304713 | 8/1929 | United Kingdom | 237/12.3 A |

*Primary Examiner*—John Ford
*Attorney, Agent, or Firm*—Banner, Birch, McKie & Beckett

[57] ABSTRACT

An air conditioning system for a working vehicle includes an air conditioning unit which is disposed within an engine room below a seat in the cabin in order to increase the usable space within the cabin. The air conditioning unit includes an evaporator, a fan, and a heater core in series. The evaporator, fan, and heater core are configured so that the air flow path between the evaporator and the fan is substantially perpendicular to the air flow path between the fan and the heater core. An inlet port is provided on the air conditioning unit at one end. An outlet port is provided on the air conditioning unit at its other end adjacent the heater core. A duct having two additional outlet ports is connected adjacent the heater core of the air conditioning unit and extends to a front part of a cabin through under a floor. This improves the heating of the lower portions of the cabin and the defrosting of the front glass of the cabin.

9 Claims, 4 Drawing Sheets

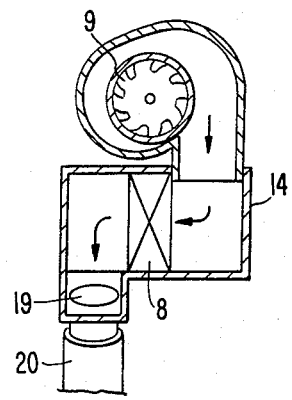
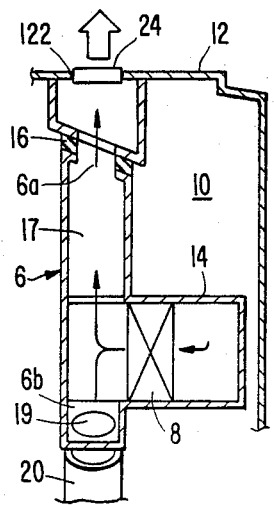
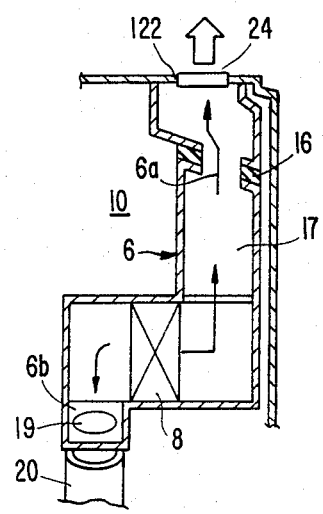

4,874,036

HEATING AND AIR CONDITIONING SYSTEM FOR A FORKLIFT

TECHNICAL FIELD

The present invention relates to working vehicles such as construction machines, agricultural machines, and industrial machines such as forklifts. More particularly, the present invention relates to a heating and air conditioning system for a working vehicle.

BACKGROUND OF THE INVENTION

FIG. 1 shows a forklift including a conventional working vehicle heating and air conditioning system. Forklift 1 is provided with steering wheel 3 and a plurality of levers at the front of cabin 2. Heating and air conditioning unit 4 is disposed on the ceiling of cabin 2. Heating and air conditioning unit 4 is provided with air inlet port 5 and air outlet port 6 and includes evaporator 7, heater core 8, and fan 9. The air inside of cabin 2 flows into heating and air conditioning unit 4 through air inlet port 5 and is cooled or heated therein before flowing out through air outlet port 6 toward the front of cabin 2.

However, because this heating and air conditioning system for a working vehicle is disposed in cabin 2, the volume of usable space within cabin 2 decreases. Also, heated air emitted from heating and air conditioning unit 4 does not circulate sufficiently within cabin 2 because heating and air conditioning unit 4 is disposed on the ceiling of cabin 2. Air around the passenger's feet is not sufficiently heated and front glass 23 is not sufficiently defrosted.

SUMMARY OF THE INVENTION

It is an object of the present invention to provide a heating and air conditioning system for a working vehicle that does not diminish the usable space within the vehicle.

It is another object of this invention to provide a heating and air conditioning system which can efficiently heat the lower portion of the cabin and defrost the front glass of the cabin.

A heating and air conditioning system for a working vehicle according to the present invention includes a heating and air conditioning unit which is disposed within an engine room located beneath the seat of the cabin. The heating and air conditioning unit includes an evaporator, a fan and a heater core disposed in series. An inlet port is provided on the heating and air conditioning unit at a first end. An outlet port is provided on the heating and air conditioning unit at a second end. A duct connected to the outlet port of the heating and air conditioning unit at the second end extends to a front part of a cabin under the floor of the cabin. The evaporator, fan, and heater core are configured so that the air flow path between the evaporator and the fan is substantially perpendicular to the air flow path between the fan and the heater core.

Various additional advantages and features of novelty which characterize the invention are further pointed out in the claims that follow. However, for a better understanding of the invention and its advantages, reference should be made to the accompanying drawings and descriptive matter which illustrate and describe preferred embodiments of the invention.

BRIEF DESCRIPTION OF THE DRAWINGS

FIG. 5 is a cross-sectional view taken along line V—V of FIG. 3.

FIG. 6 is a cross-sectional view taken along line VI—VI of FIG. 3.

FIG. 7 is a cross-sectional view showing a modification of the exhaust passage of FIG. 6.

DETAILED DESCRIPTION OF PREFERRED EMBODIMENTS

Figure 1:
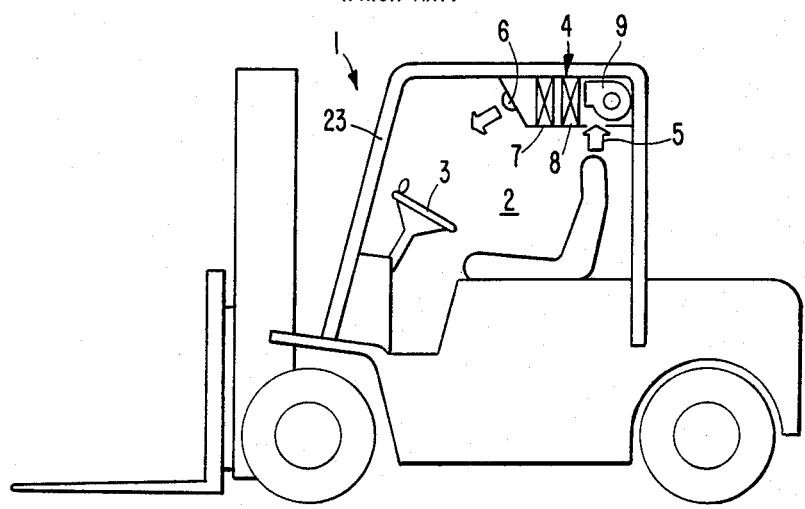
FIG. 1 is a schematic side view of a forklift including a conventional heating and air conditioning system for a working vehicle.
Figure 2:
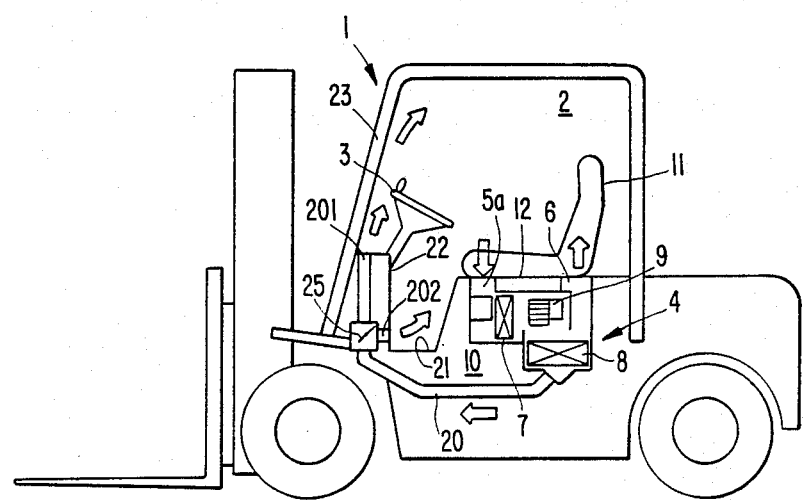
FIG. 2 is a schematic side view of a forklift including a heating and air conditioning system for a working vehicle in accordance with one embodiment of this invention.
Figure 3:
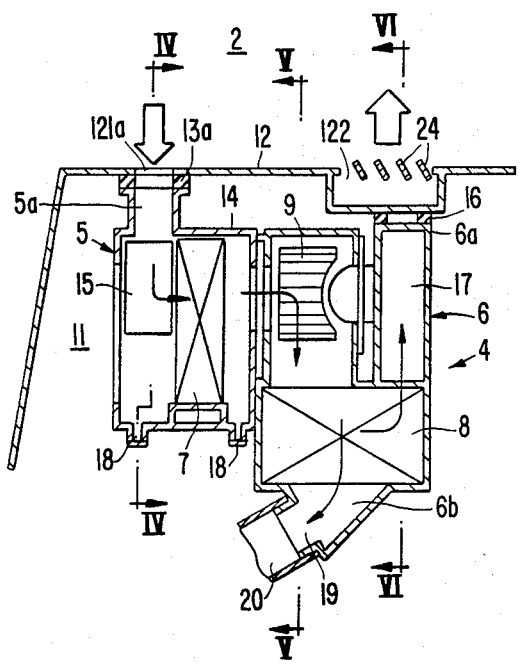
FIG. 3 is an enlarged cross-sectional view of the heating and air conditioning unit shown in FIG. 2.
Figure 4:
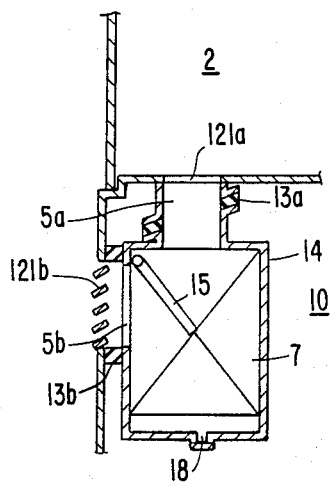
FIG. 4 is a cross-sectional view taken along line IV—IV of FIG. 3.

With reference to FIGS. 2, 3, and 4, a heating and air conditioning system for a working vehicle in accordance with one embodiment of this invention is shown. Heating and air conditioning unit 4 which includes inlet port 5, outlet port 6, evaporator 7, fan 9 and heater core 8 is provided within engine room 10 under seat 11. Hood 12 covers heating and air conditioning unit 4 in engine room 10 and is provided with first inlet hole 121a, second inlet hole 121b, and outlet hole 122. The inlet holes 121 correspond to inlet port 5 and outlet hole 122 corresponds to outlet port 6. Inlet port 5 which is formed on casing 14 includes first inlet port portion 5a for circulating the inside air and second inlet port portion 5b for introducing the outside air into the system. Outlet port 6 which is also formed on casing 14 includes first outlet port portion 6a and second outlet port portion 6b for emitting air conditioned air. Casing 14 can be separately formed for evaporator 7, heater core 8, and fan 9, or integrally formed as one piece for all of these units.

First inlet port portion 5a is coupled with first inlet hole 121a through gasket 13a to communicate the interior of casing 14 with the interior of cabin 2. Second inlet port portion 5b is coupled with second inlet hole 121b through gasket 13b to communicate the interior of casing 14 with the atmosphere. Damper plate 15 is disposed in casing 14 to be rotatable within a range of about 90° so that the introduction of the inside air or atmospheric air to the interior of casing 14 can be varied. First outlet port portion 6a is coupled with outlet hole 122 through gasket 16 to interconnect exhaust passage 17 with the interior of cabin 2. Grill 24 is rotatably disposed in outlet hole 122 to change the direction of the air flowing therethrough. Second outlet portion 6b is integrally formed with duct connecting portion 19 on casing 14. Gaskets 13a, 13b, and 16 can be fixed on the side of hood 12 or casing 14.

Evaporator 7, fan 9, and heater core 8 are disposed within the interior of casing 14, respectively in series. Drainpipes 18 are formed integrally on the bottom portion of casing 14 to drain water from evaporator 7. Duct connecting portion 19 is also formed integrally with casing 14 under heater core 8 to interconnect the interior of casing 14 with duct 20. Evaporator 7 is positioned in a substantially horizontal plane with fan 9. Heater core 8 is positioned in a substantially vertical plane with and below fan 9. Due to this arrangement of evaporator 7, fan 9, and heater core 8, the length of air conditioning unit 4 is reduced. Accordingly, heating and air conditioning unit 4 can be disposed within a small engine room 10.

Duct 20 extends to a front portion of cabin 2 underneath floor 21 of cabin 2 and includes second outlet port 201 and third outlet port 202. Second outlet port 201 is disposed at the top portion of front panel 22 of cabin 4 to defrost front glass 23. Third outlet port 202 is located at the junction of front panel 22 and floor 21 to distribute warm air from duct 20 to the feet of the passengers in the lower portion of cabin 2. Damper plate 25 disposed between front panel 22 and floor 21 distributes air flowing from duct 20 through either second outlet port 201 or third outlet port 202.

Figure 8:
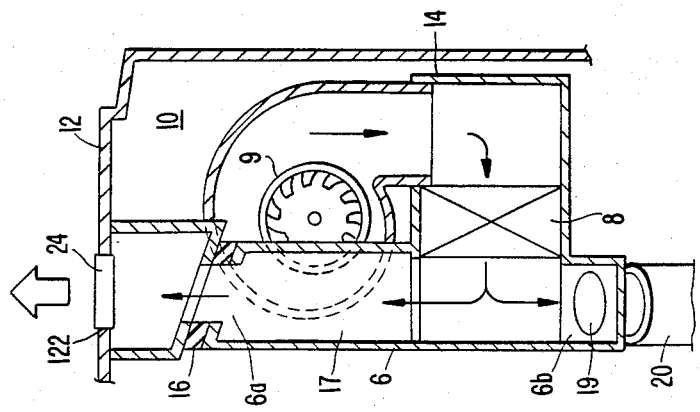
FIG. 8 is a cross-sectional view similar to FIG. 6 additionally showing the fan.

The operation of the heating and air conditioning system for a working vehicle is as follows. When the heating and air conditioning system operates, the air entering first inlet hole 121a of hood 12 passes through evaporator 7, fan 9, and heater core 8, and is separated into exhaust passage 17 and duct 30 as shown in FIGS. 6 and 8. The air flow paths between evaporator 7 and fan 9, and between fan 9 and heater core 8, are substantially perpendicular to each other. The air which passes through exhaust passage 17 flows through first outlet port portion 6a to the interior of cabin 2 and the air which passes through duct 20 flows through second or third outlet port portions 201 or 202 to the interior of cabin 2. The cooling or heating of the air is selected by changing the heating volume of evaporator 7 and heater core 8.

Figure 9:
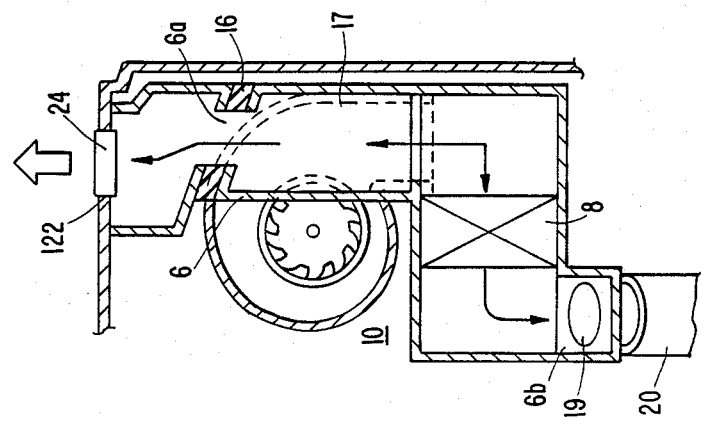
FIG. 9 is a cross-sectional view similar to FIG. 7 additionally showing the fan.

FIGS. 7 and 9 show a modification of the exhaust passage of FIGS. 6 and 8. The air distributed by fan 9 is separated before passing through heater core 8. The air exits the fan to the right of heater core 8 and behind the plane of the Figures. One air stream flows through exhaust passage 17 and into the interior of cabin 2. The other air stream flows through heater core 8 and into the interior of cabin 2 through duct 20.

Numerous characteristics, advantages, and embodiments of the invention have been described in detail in the foregoing description with reference to the accompanying drawings. However, the disclosure is illustrative only and the invention is not limited to the precise illustrated embodiments. Various changes and modifications may be effected therein by one skilled in the art without departing from the scope or spirit of the invention.

I claim:

1. A heating and air conditioning system for a forklift having a cabin with a seat and a front glass, said heating and air conditioning system comprising a heating and air conditioning unit disposed within an engine room located below the seat, said heating and air conditioning unit comprising an evaporator, a fan, and a heater core, said heating and air conditioning unit having an air flow path between said evaporator and said fan and an air flow path between said fan and said heater core, wherein said heater core is positioned below said fan at a substantially right angle to said evaporator so that the air flow path between said evaporator and said fan is substantially perpendicular to the air flow path between said fan and said heater core, an inlet port disposed on said heating and air conditioning unit adjacent said evaporator, a first outlet port disposed on said heating and air conditioning unit adjacent said heater core, and a duct having a first and adjacent said heater core and a second end extending to a front portion of the cabin under the floor of the cabin.

2. The air conditioning system for the forklift of claim 1 wherein said inlet port is divided into a first inlet port portion communicating with the cabin and a second inlet port portion communicating with the atmospheric air outside the cabin.

3. The air conditioning system for the forklift of claim 2 wherein said engine room comprises a hood, said hood comprising an inlet hole coupled with said first inlet port portion of said air conditioning unit through a first gasket and an outlet hole connected with said first outlet port of said air conditioning unit through a second gasket.

4. The air conditioning system for the forklift of claim 3 wherein said inlet port comprises a damper plate to selectively interconnect said first inlet port portion and said second inlet port portion with said evaporator.

5. The air conditioning system for the forklift of claim 1 wherein said second end of said duct comprises second and third outlet ports which are positioned to permit air to flow across the front glass of the cabin and across the bottom portion of the cabin, respectively.

6. The air conditioning system for the forklift of claim 1 wherein said air conditioning unit is enclosed by a casing, said casing being integrally formed to said unit.

7. The air conditioning system for the forklift of claim 2 wherein said inlet port is divided into a first port portion communicating with the cabin and a second inlet portion communicating with the atmospheric air outside the cabin.

8. The air conditioning system for the forklift of claim 7 wherein said engine room comprises a hood, said hood comprising an inlet hole coupled with said first inlet port portion of said air conditioning unit through a first gasket and an outlet hole connected with said first outlet port portion of said air conditioning unit through a second gasket.

9. The air conditioning system for the forklift of claim 8 wherein said inlet port comprises a damper plate to selectively interconnect said first inlet port portion and said second inlet port portion with said evaporator.

* * * * *